(12) United States Patent
Garg

(10) Patent No.: US 8,577,150 B2
(45) Date of Patent: Nov. 5, 2013

(54) SYSTEM AND METHOD FOR REMOVING SPECULARITY FROM AN IMAGE

(75) Inventor: Kshitiz Garg, Pittsburgh, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 294 days.

(21) Appl. No.: 13/065,274

(22) Filed: Mar. 18, 2011

(65) Prior Publication Data

US 2012/0237128 A1    Sep. 20, 2012

(51) Int. Cl.
G06K 9/46    (2006.01)
G06K 9/66    (2006.01)

(52) U.S. Cl.
USPC .......................... 382/191; 382/190; 382/192

(58) Field of Classification Search
None
See application file for complete search history.

(56) References Cited

U.S. PATENT DOCUMENTS

| | | | |
|---|---|---|---|
| 7,596,266 B2 | 9/2009 | Maxwell et al. | 382/167 |
| 7,672,530 B2 | 3/2010 | Friedhoff et al. | 382/266 |
| 7,873,219 B2 | 1/2011 | Friedhoff | 382/199 |
| 2007/0176941 A1 | 8/2007 | Maxwell et al. | |
| 2007/0242878 A1* | 10/2007 | Maxwell et al. | 382/168 |
| 2007/0263944 A1 | 11/2007 | Smith et al. | |
| 2009/0304299 A1 | 12/2009 | Motomura et al. | |
| 2010/0142825 A1* | 6/2010 | Maxwell et al. | 382/199 |
| 2011/0064263 A1* | 3/2011 | de Haan et al. | 382/100 |

OTHER PUBLICATIONS

Lin et al., "Highlight Removal by Illumination-constrained Inpainting," 2003, Int. Conf. on Computer Vision.*
"Inpainting and the Fundamental Problem of Image Processing" by Shen, SIAM News, vol. 36, No. 5, Jun. 2003.
M. Bertalmio, A. L. Bertozzi, G. Sapiro, "Navier-Stokes, Fluid Dynamics, and Image and Video Inpainting", Proceedings of the International Conference on Computer Vision and Pattern Recognition, IEEE, Dec. 2001, Kauai, HI, vol. I, pp. I-355-I362.
M. Bertalmio, G. Sapiro, V. Caselles, and C. Ballester, "Image Inpainting", SIGGRAPH 2000, pp. 417-424.
Alexandru Telea. An image inpainting technique based on the fast marching method. Journal of Graphics, GPU, and Game Tools, 9(1):23-34, 2004.

* cited by examiner

Primary Examiner — Amir Alavi
Assistant Examiner — Kenny Cese
(74) Attorney, Agent, or Firm — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, processing the image to generate intrinsic images including a material image and an illumination image, and detecting and removing specularity as a function of the intrinsic images.

21 Claims, 15 Drawing Sheets

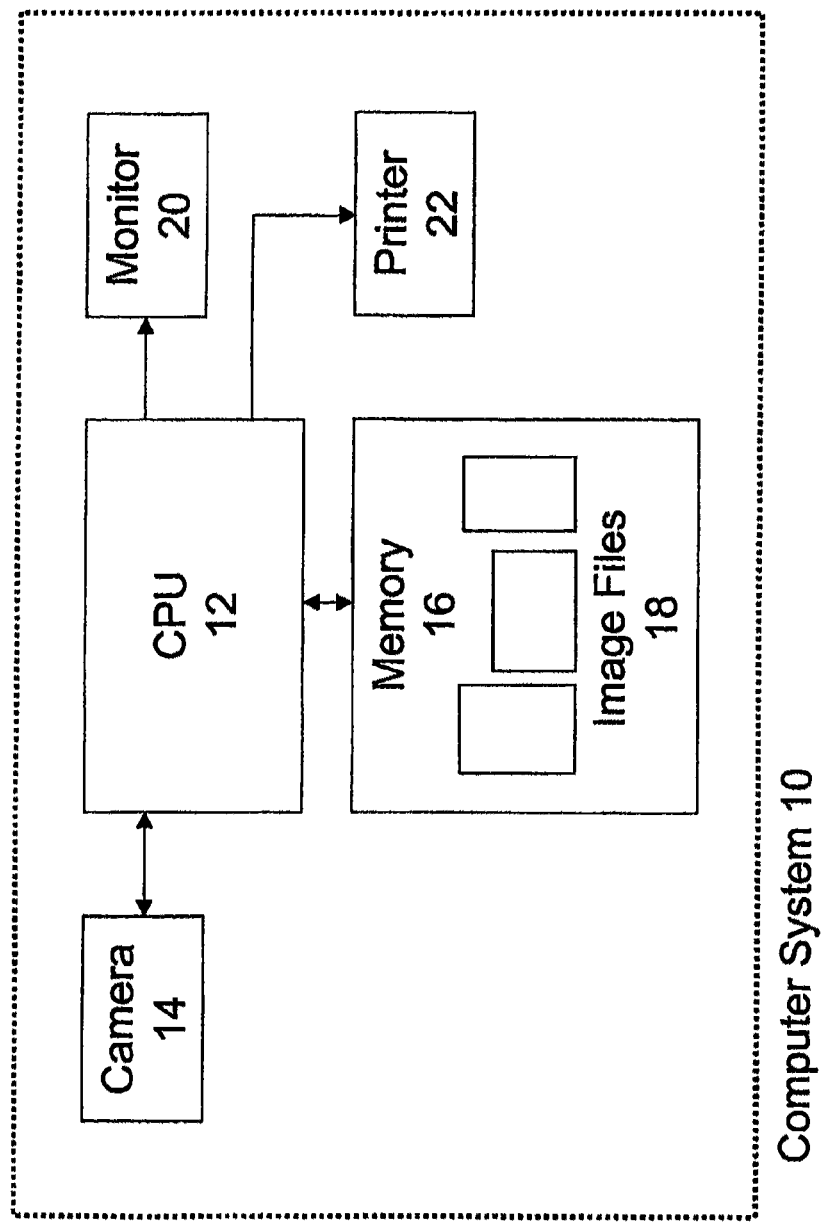
Figure 1: Computer System Configured to Operate on Images

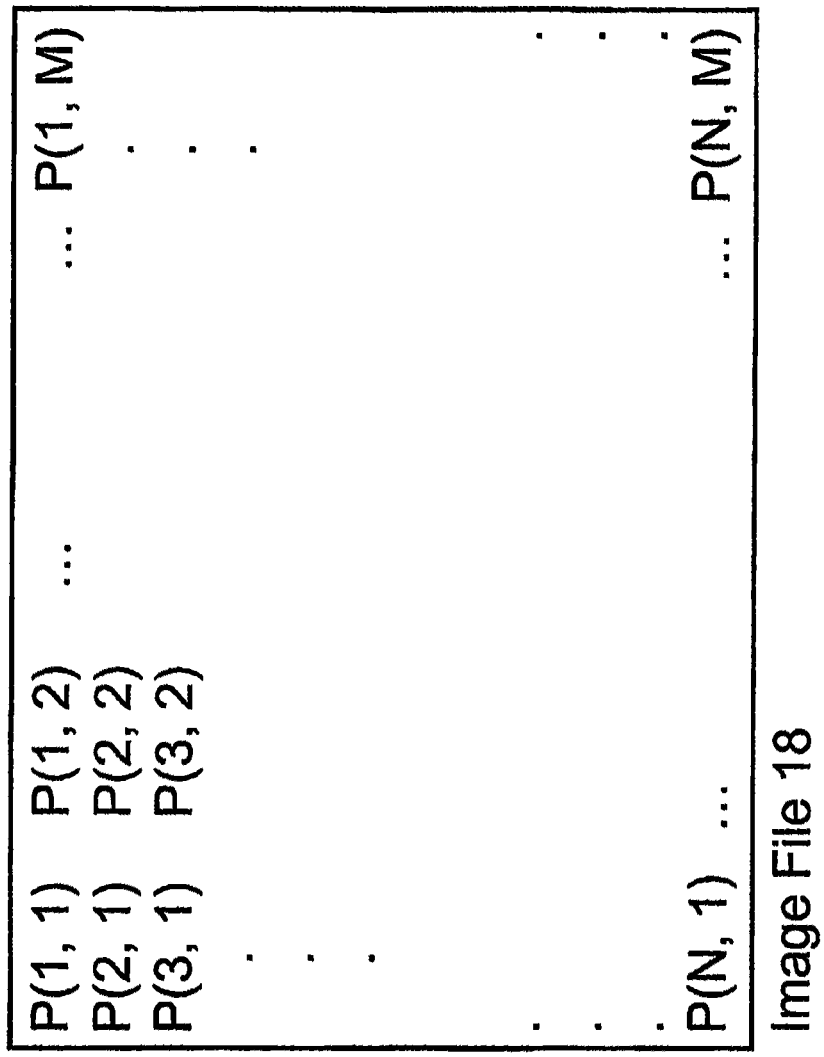

Original Image

Token Regions

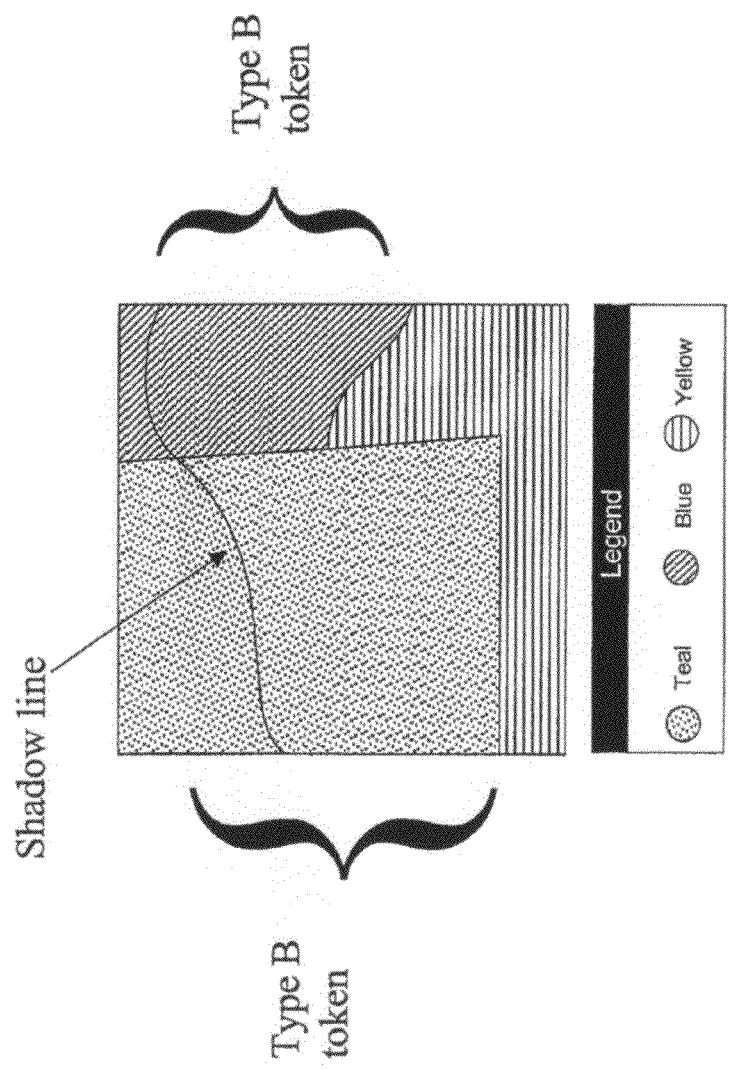
Figure 4D: Type B Tokens

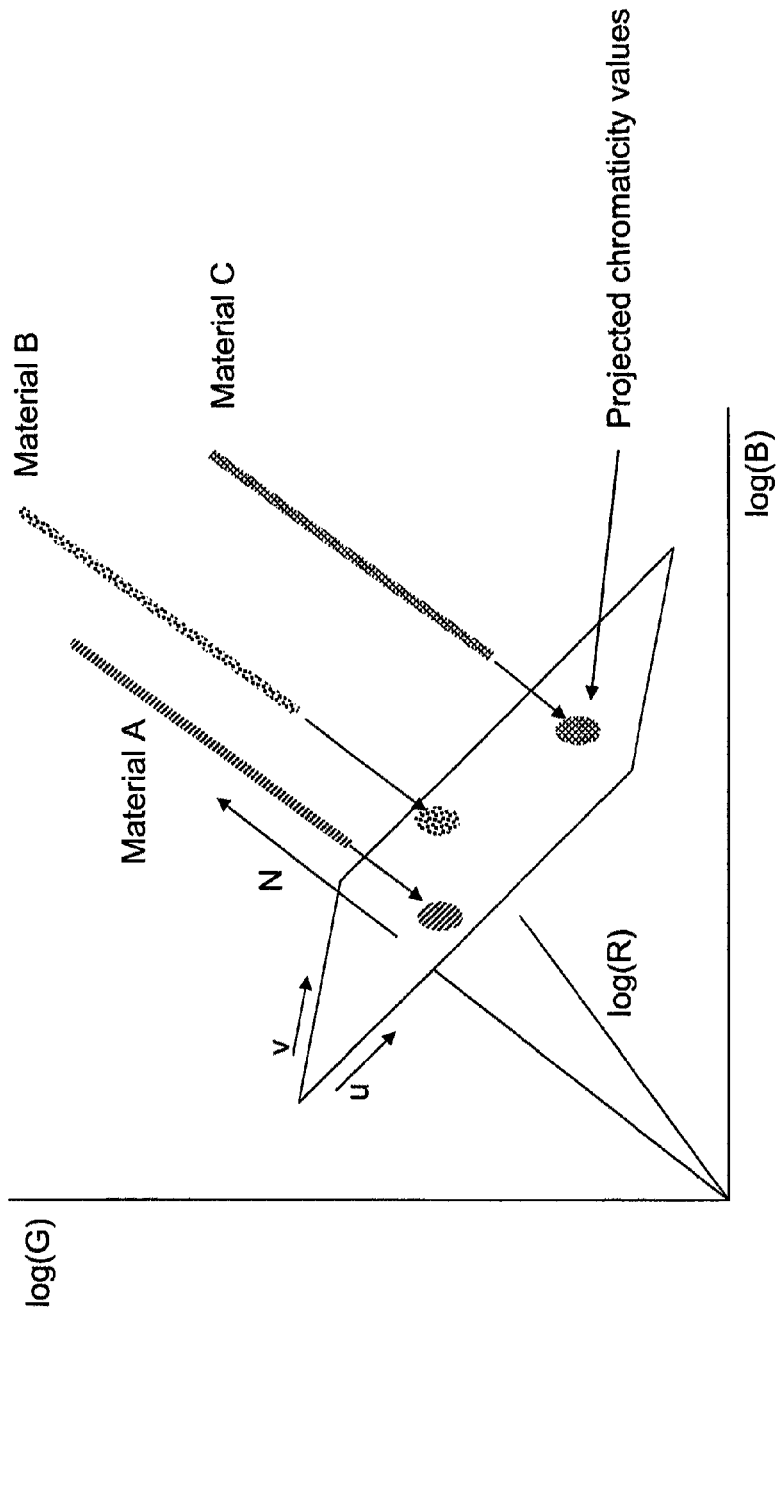
Figure 5: Log Color Space Chromaticity Plane
N = Log Space Chromaticity Plane Normal

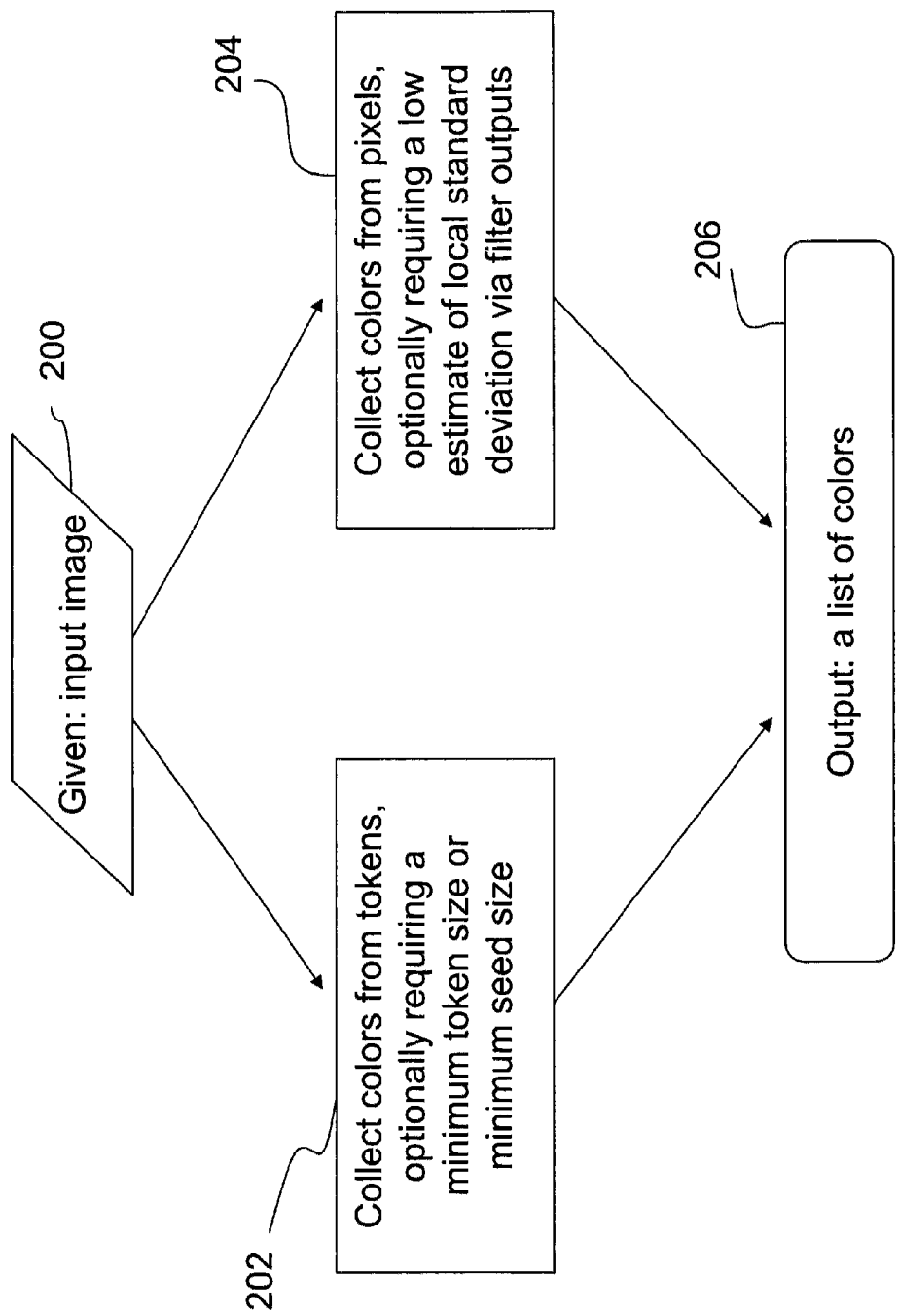
Figure 6: Selecting colors from an image

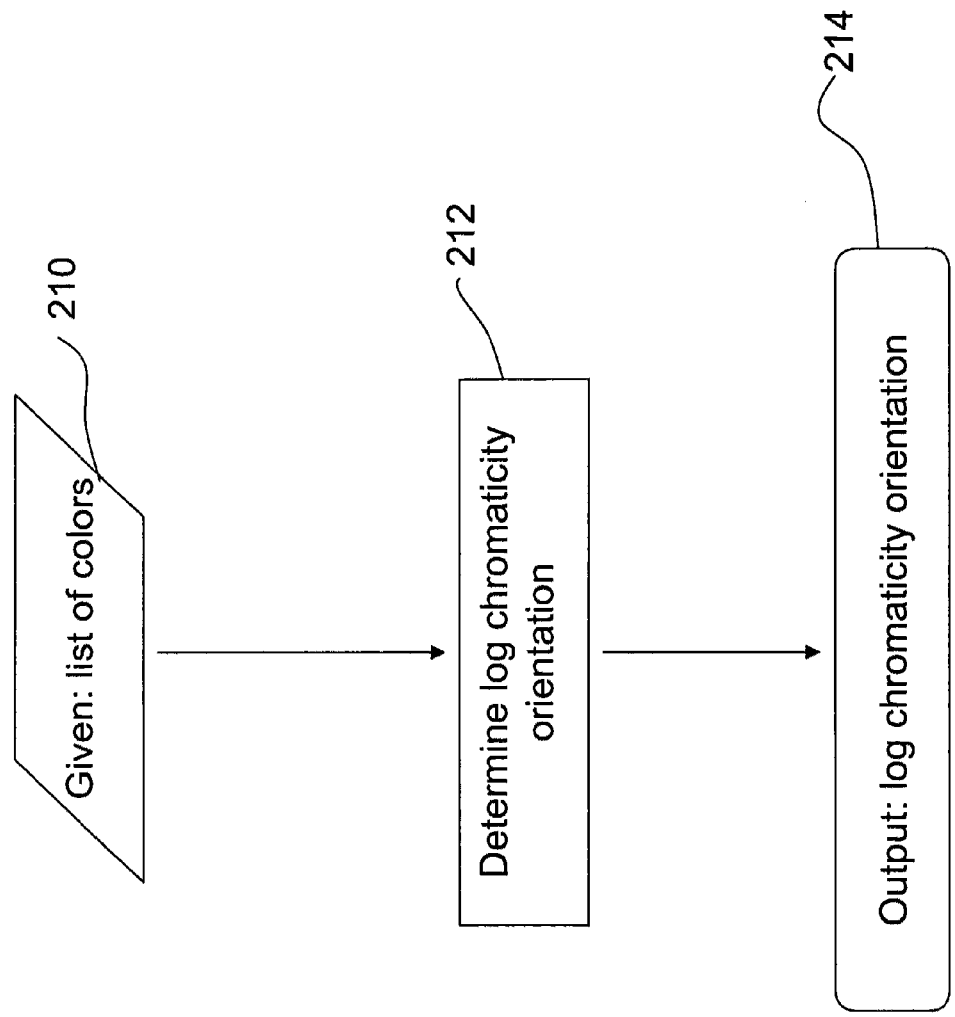
Figure 7: Determining the log chromaticity orientation

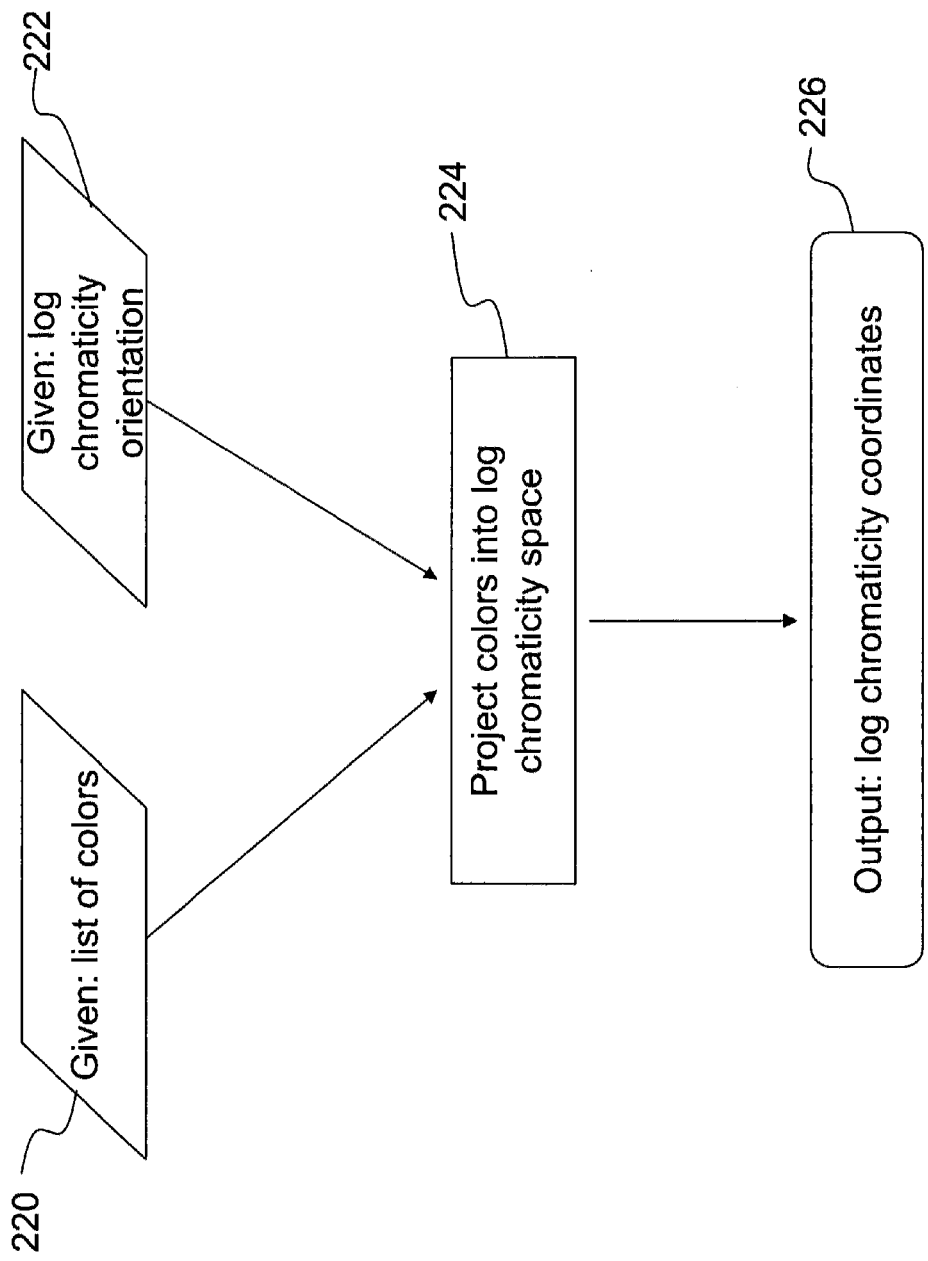
Figure 8: Determining log chromaticity coordinates

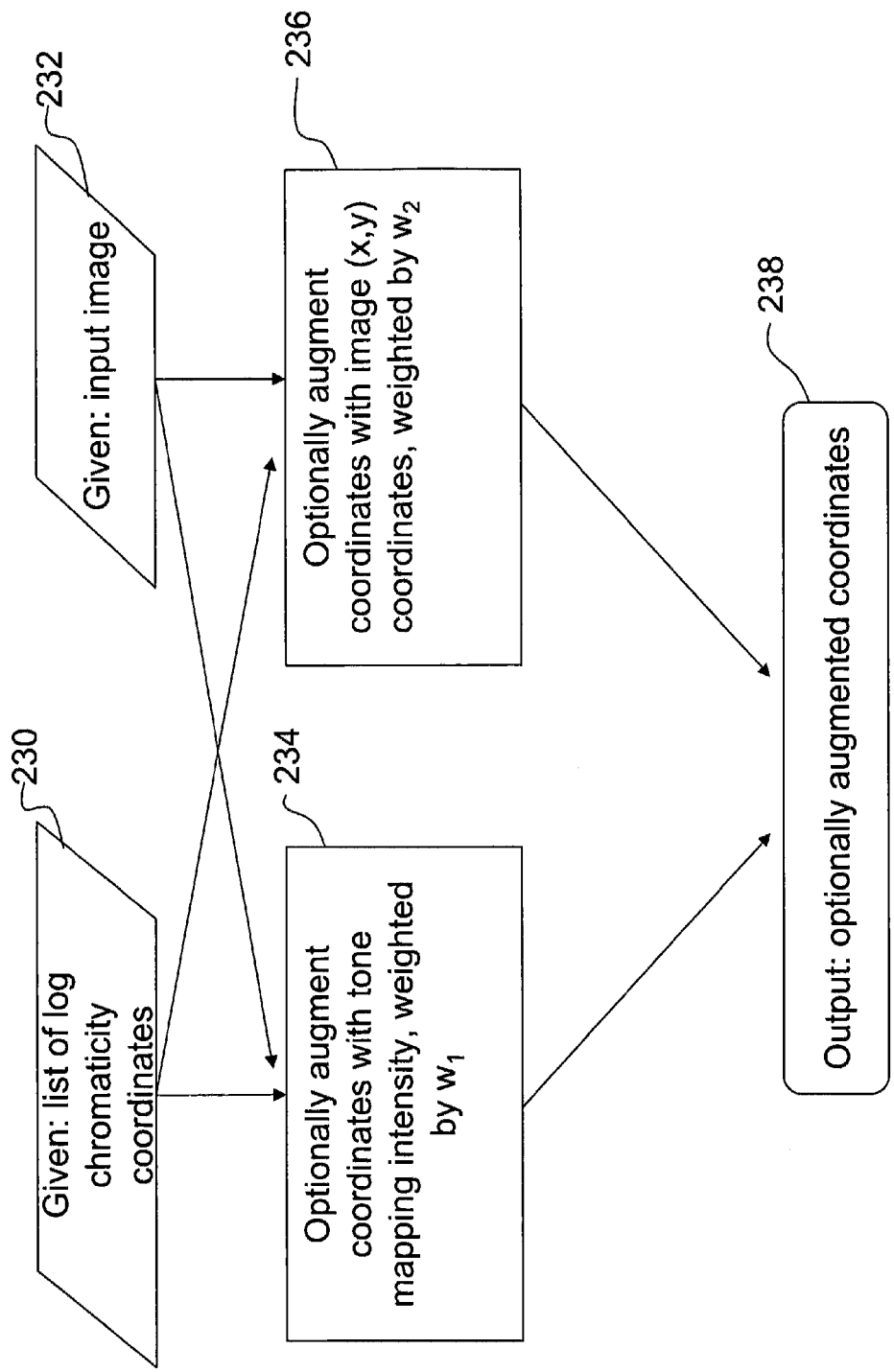
Figure 9: Optionally augmenting log chromaticity coordinates

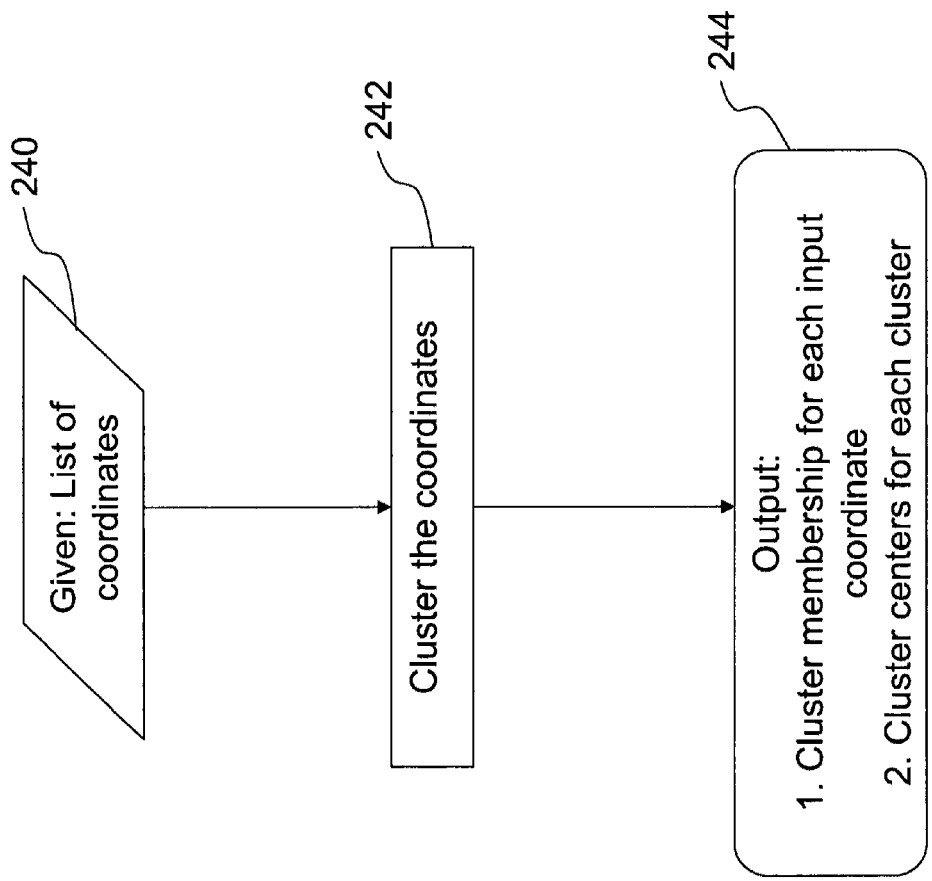
Figure 10: Clustering log chromaticity coordinates

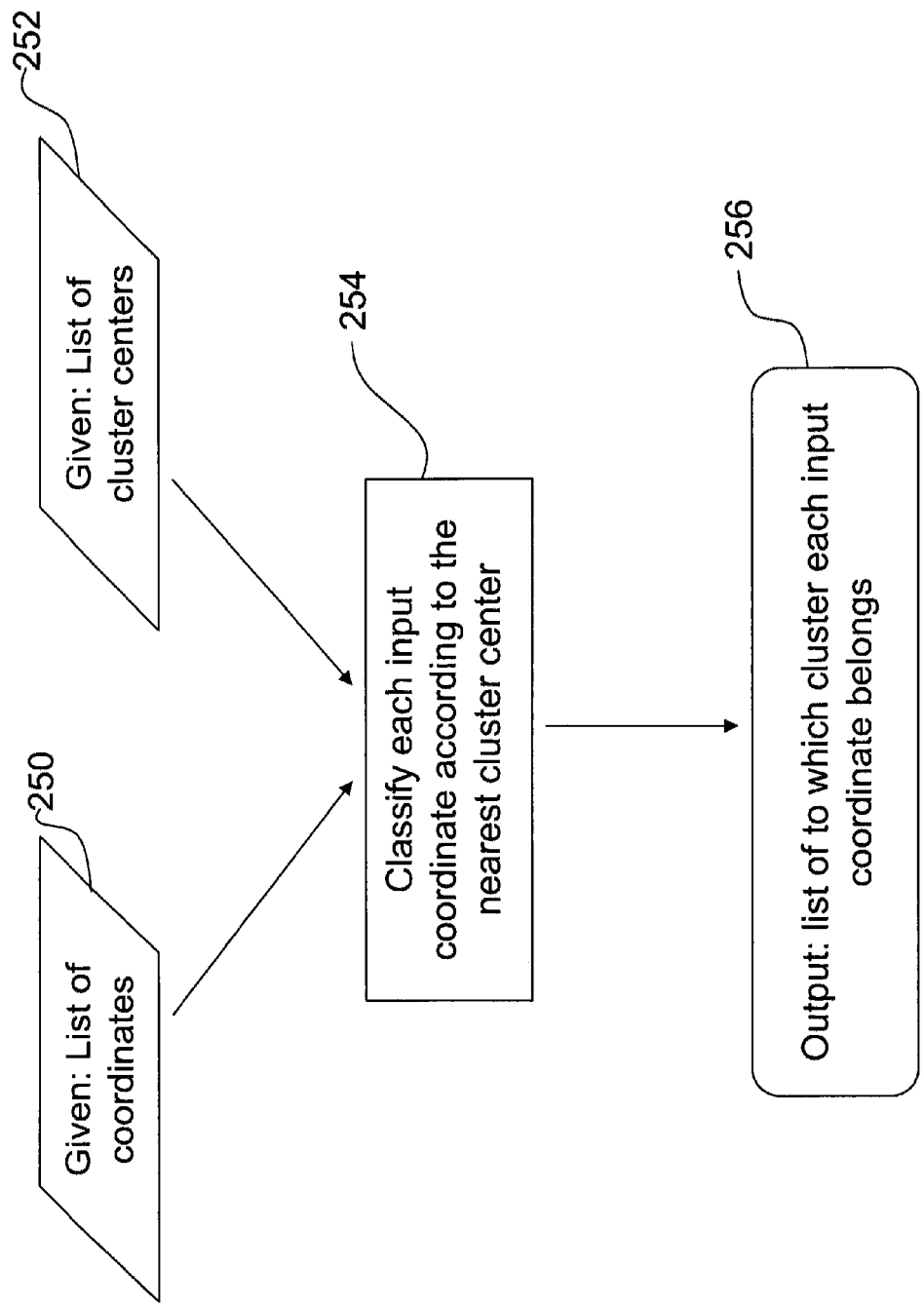
Figure 11: Assigning coordinates to clusters

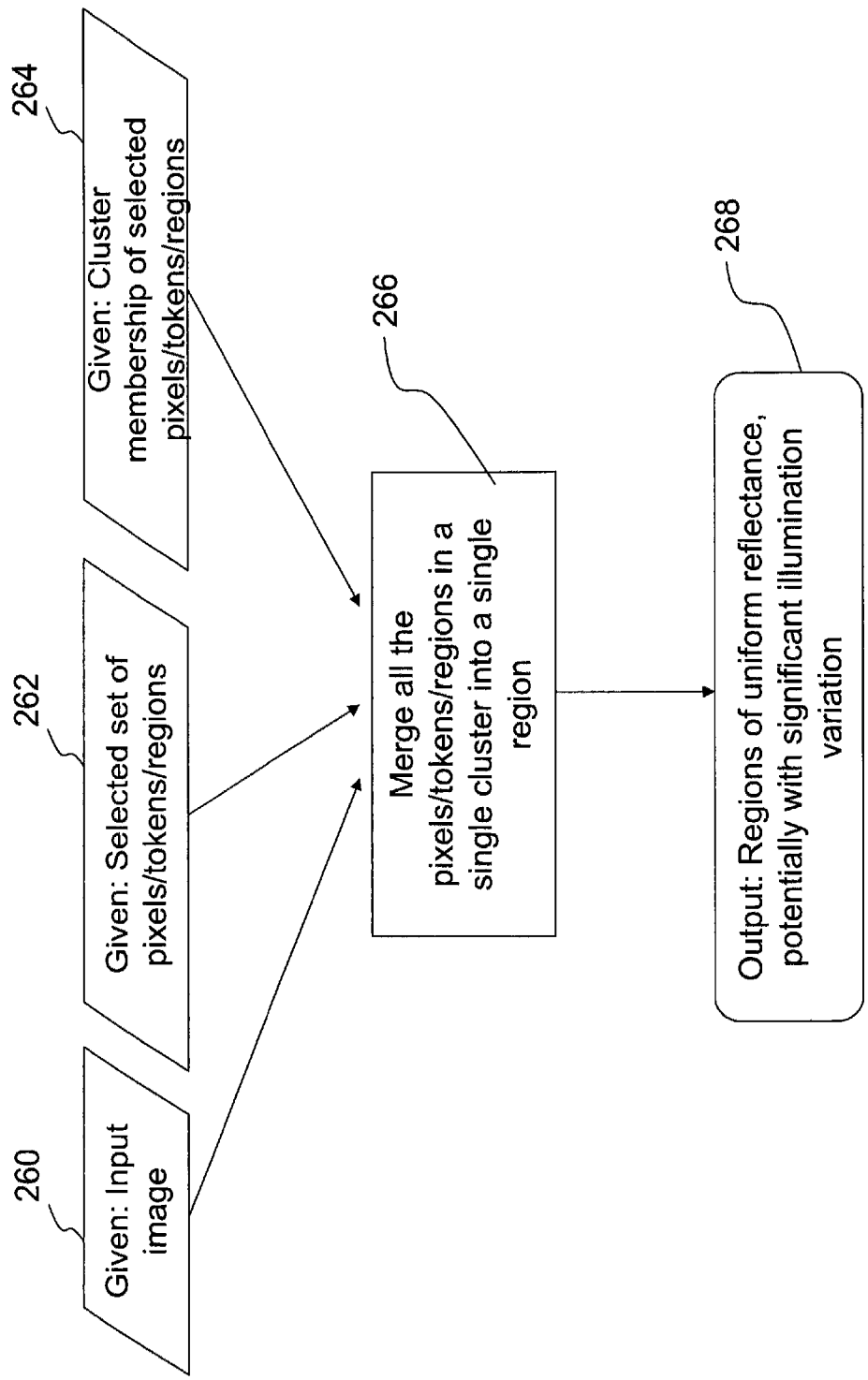
Figure 12: Detecting regions of uniform reflectance based on log chromaticity clustering

SYSTEM AND METHOD FOR REMOVING SPECULARITY FROM AN IMAGE

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy and effectiveness of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff Patents).

SUMMARY OF THE INVENTION

The present invention provides an improvement and enhancement to the fundamental teachings of the Friedhoff Patents, and includes a method and system comprising image techniques that accurately and correctly identify intrinsic images corresponding to an original image, including the removal of any specularity that may appear in the original image. The intrinsic images include an illumination image and a material reflectance image.

In a first exemplary embodiment of the present invention, an automated, computerized method is provided for processing an image. According to a feature of the present invention, the method comprises the steps of providing an image file depicting an image, in a computer memory, processing the image to generate intrinsic images including a material image and an illumination image, and detecting and removing specularity in the image as a function of the intrinsic images. In a preferred exemplary embodiment of the present invention, the step of removing specularity as a function of the intrinsic images, is executed in respect to the illumination image. Moreover, in the preferred exemplary embodiment, the step of removing specularity is executed by an in-painting technique.

In a second exemplary embodiment of the present invention, a computer system is provided. The computer system comprises a CPU and a memory storing an image file containing an image. According to a feature of the present invention, the CPU is arranged and configured to execute a routine to process the image to generate intrinsic images including a material image and an illumination image, and detect and remove specularity in the image as a function of the intrinsic images.

In a third exemplary embodiment of the present invention, a computer program product, disposed on a non-transitory computer readable media is provided. The computer program product includes computer executable process steps operable to control a computer to: provide an image file depicting an image, in a computer memory, process the image to generate intrinsic images including a material image and an illumination image, and detect and remove specularity in the image as a function of the intrinsic images.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 4D shows Type B tokens, generated from the Type C tokens of FIG. 4C, according to a feature of the present invention.

FIG. 5 is a graphic representation of a log color space chromaticity plane according to a feature of the present invention.

FIG. 6 is a flow chart for determining a list of colors depicted in an input image.

FIG. 7 is a flow chart for determining an orientation for a log chromaticity space, according to a feature of the present invention.

FIG. 8 is a flow chart for determining log chromaticity coordinates for the colors of an input image, as determined through execution of the routine of FIG. 6, according to a feature of the present invention.

FIG. 9 is a flow chart for augmenting the log chromaticity coordinates, as determined through execution of the routine of FIG. 8, according to a feature of the present invention.

FIG. 10 is a flow chart for clustering the log chromaticity coordinates, according to a feature of the present invention.

FIG. 11 is a flow chart for assigning the log chromaticity coordinates to clusters determined through execution of the routine of FIG. 10, according to a feature of the present invention.

FIG. 12 is a flow chart for detecting regions of uniform reflectance based on the log chromaticity clustering according to a feature of the present invention.

DETAILED DESCRIPTION OF THE PREFERRED EMBODIMENTS

Figure 3A:
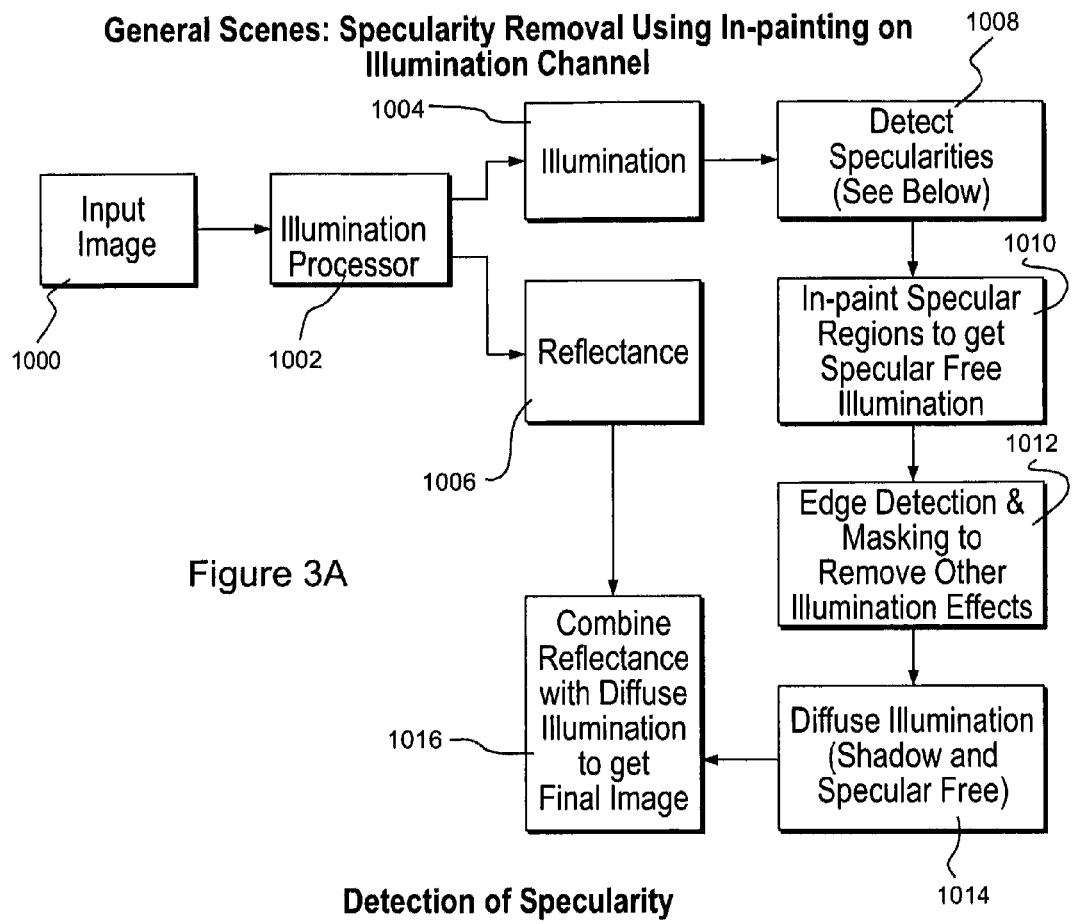
FIG. 3A is a flow chart for a routine to generate intrinsic images and including a technique to remove specularity from an image, according to a feature of an exemplary embodiment of the present invention.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, as disclosed in the Friedhoff Patents, is that an image comprises two components, material and illumination. All changes in an image are caused by one or the other of these components. A method for detecting one of these components, for example, material, provides a mechanism for distinguishing material or object geometry, such as object edges, from illumination and shadow boundaries.

Such a mechanism enables techniques that can be used to generate intrinsic images. The intrinsic images correspond to an original image, for example, an image depicted in an input image file 18. The intrinsic images include, for example, an illumination image, to capture the intensity and color of light incident upon each point on the surfaces depicted in the image, and a material or reflectance image, to capture reflectance properties of surfaces depicted in the image (the percentage of each wavelength of light a surface reflects). The separation of illumination from material in the intrinsic images provides the CPU 12 with intrinsic images that are optimal for more effective and accurate further processing.

For example, according to a feature of the present invention, specularity in an image is detected and removed from a scene depicted in an image file 18, by operating on intrinsic images generated from the original image of the image file 18. For example, detected specularity is removed from the illumination image. Specularity in an image refers to the occurrence of a mirror-like specular reflection of light from a material surface depicted in the image.

Materials such as glass, metal, human skin and most painted material surfaces are quite glossy and can exhibit prominent specularities when depicted in an image. The present invention recognizes that specularity can contain both material and illumination properties and that the detection and removal of specularities can be improved by operating on intrinsic material and illumination images generated from an original image.

Characteristic properties of specularity that can be used to detect specular regions in an image include the fact that specular regions are typically much brighter than surrounding regions, specularaties posses the color of the illuminating source, specularaties have characteristic shapes, for example, circular spots for spherical objects and linear spots for cylindrically shaped objects, brightness at a region of specular pixels, falls abruptly, from illumination color to material color, and specular regions show a T shaped color distribution when analyzed in a color space, at a local region.

During the execution of a computer processing technique for the analysis of an image, the occurrence of specularities can interfere with a correct and accurate performance of the executed technique. For example, in a face recognition program, facial skin regions that exhibit specular reflections can cause a face recognition operation to fail. As recognized by the present invention, properties of specularity manifest, for example, in the illumination, and, according to an exemplary embodiment of the present invention, processing relevant to removal of specularity is performed in the illumination image so as to not adversely impact material reflectance aspects of an image when removing specularities, for improved results.

Moreover, according to further teachings of the present invention, either or both the material and illumination images are used in the detection and removal of specularities. For example, both the material and illumination images are used to detect specularity, and the illumination image is used to remove the detected specularity. The material image can also be improved after detection of specularity to eliminate color artifacts caused by the detected specularity.

FIG. 3A is a flow chart for a routine to generate intrinsic images, including a technique to remove specularity from an image, according to a feature of an exemplary embodiment of the present invention. In step 1000, the CPU 12 receives an input image, such as an image file 18, stored in the memory 16 of the computer system 10. In step 1002, the input image is processed by the CPU 12 to output intrinsic illumination and material (reflectance) images corresponding to the input image (steps 1004, 1006).

According to a feature of the exemplary embodiment of the present invention, in step 1002, the CPU 12 is configured as an illumination processor to perform operations to segregate the input image into the corresponding intrinsic images (steps 1004, 1006). In the exemplary embodiment of the present invention, a token based method is implemented to process the input image for generation of the illumination and reflectance images.

Pursuant to a feature of the present invention, a token is a connected region of an image wherein the pixels of the region are related to one another in a manner relevant to identification of image features and characteristics such as an identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type B token can also be defined as a collection of one or more image regions or pixels, all of which have the same reflectance (material color) though not necessarily all pixels which correspond to that material color. A Type C token comprises a connected image region of similar image properties among the contiguous pixels of the token, where similarity is defined with respect to a noise model for the imaging system used to record the image.

Figure 4A:
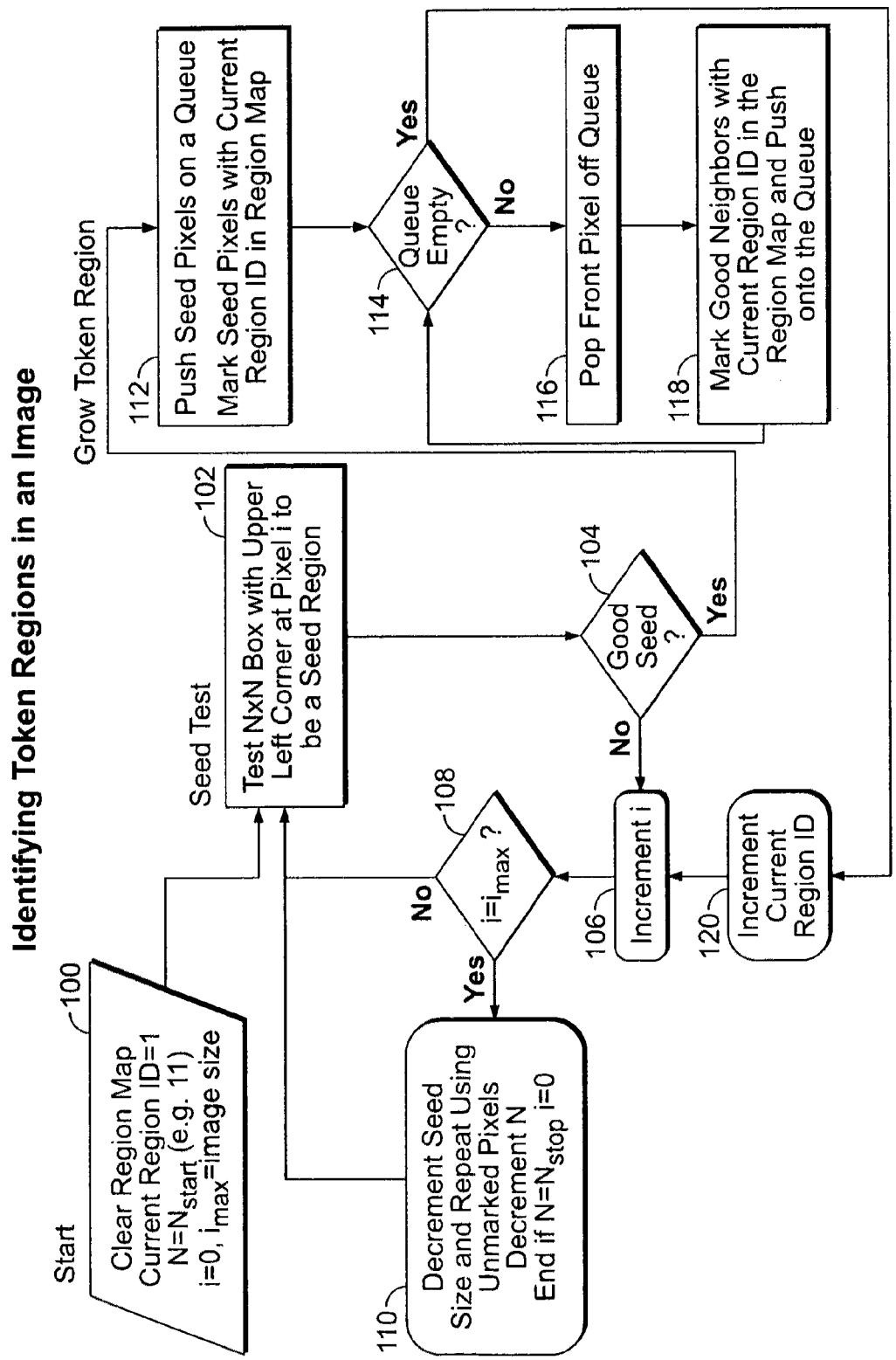
FIG. 4A is a flow chart for identifying Type C token regions in the image file of FIG. 2, according to a feature of the present invention.

Referring now to FIG. 4A, there is shown a flow chart for identifying Type C token regions in the scene depicted in the image file 18 of FIG. 2, according to a feature of the present invention. Type C tokens can be readily identified in an image, utilizing the steps of FIG. 4A, and then analyzed and processed to construct Type B tokens, according to a feature of the present invention.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at I=0, and a number for an N×N pixel array, for use as a seed to determine the token, is set an initial value, $N=N_{start}$. $N_{start}$ can be any integer>0, for example it can be set at set at 11 or 15 pixels.

At step 102, a seed test is begun. The CPU 12 selects a first pixel, I=1, pixel (1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel. If the comparison does not result in approximately equal values (within the noise levels of the recording device) for the pixels in the seed, the CPU 12 increments the value of I (step 106), for example, I=2, pixel (1, 2), for a next N×N seed sample, and then tests to determine if I=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 4A parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good' neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 4B:
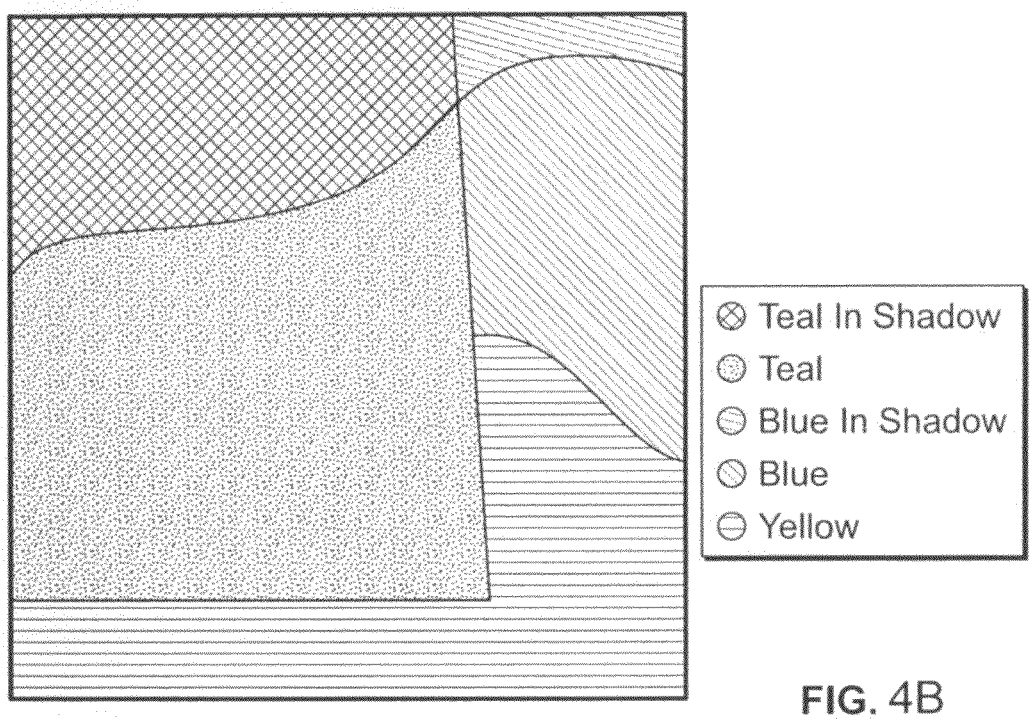
FIG. 4B is an original image used as an example in the identification of Type C tokens.
Figure 4C:
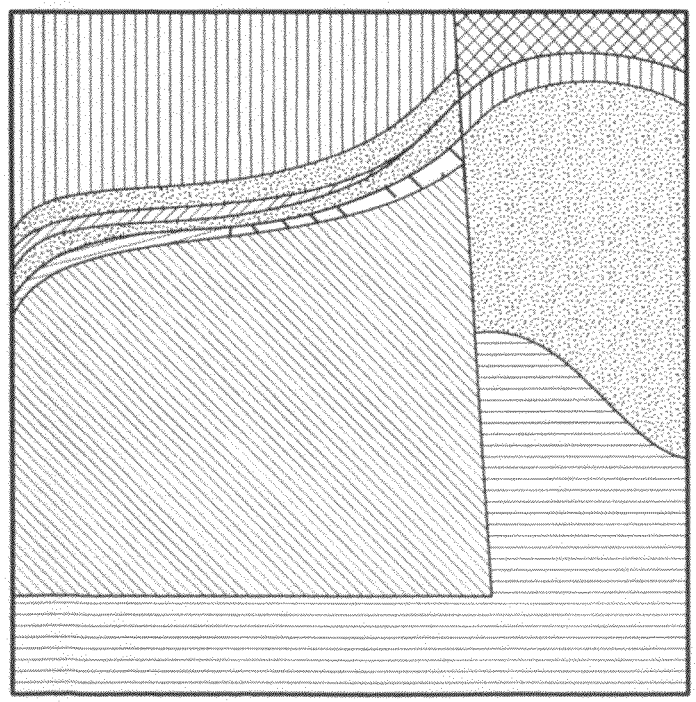
FIG. 4C shows Type C token regions in the image of FIG. 4B.

Upon arrival at $N=N_{stop}$, step 110 of the flow chart of FIG. 4A, or completion of a region map that coincides with the image, the routine will have completed the token building task. FIG. 4B is an original image used as an example in the identification of tokens. The image shows areas of the color blue and the blue in shadow, and of the color teal and the teal in shadow. FIG. 4C shows token regions corresponding to the region map, for example, as identified through execution of the routine of FIG. 4A (Type C tokens), in respect to the image of FIG. 4B. The token regions are color coded to illustrate the token makeup of the image of FIG. 4B, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 4E:
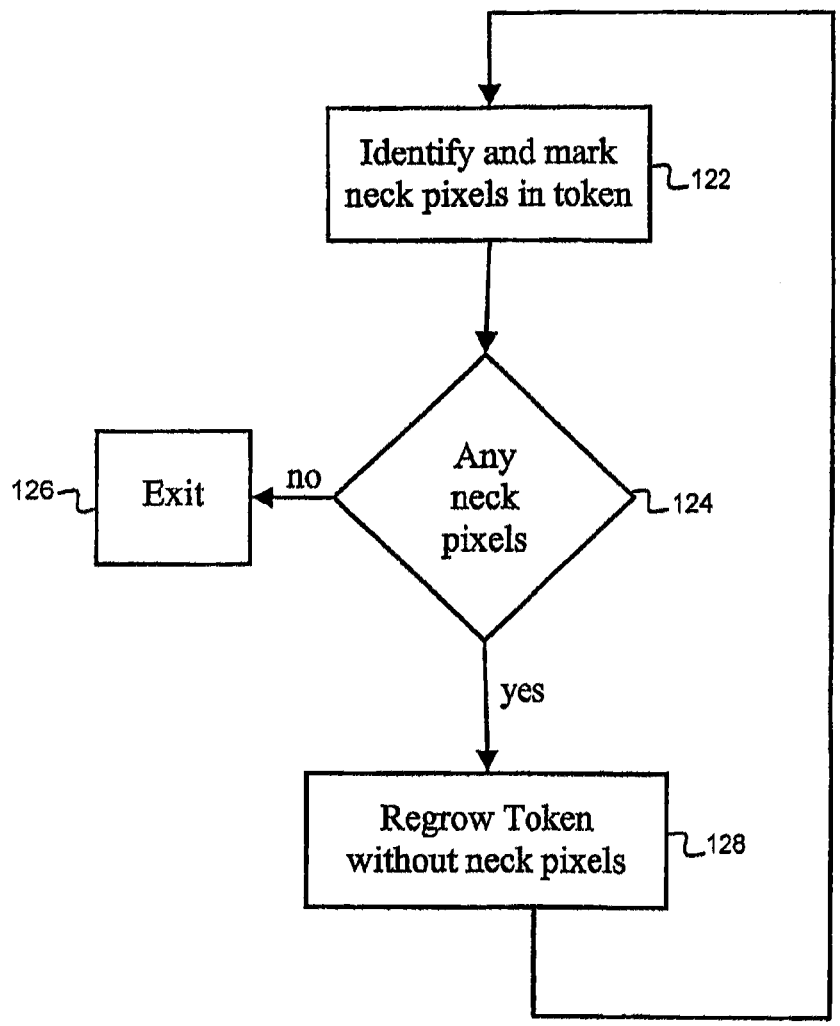
FIG. 4E is a flow chart for a routine to test Type C tokens identified by the routine of the flow chart of FIG. 4A, according to a feature of the present invention.

FIG. 4E shows a flow chart for a neck test for Type C tokens. In step 122, the CPU 12 examines each pixel of an identified token to determine whether any of the pixels under examination forms a neck. The routine of FIG. 4E can be executed as a subroutine directly after a particular token is identified during execution of the routine of FIG. 4A. All pixels identified as a neck are marked as "ungrowable." In decision block 124, the CPU 12 determines if any of the pixels were marked.

If no, the CPU 12 exits the routine of FIG. 4E and returns to the routine of FIG. 4A (step 126).

If yes, the CPU 12 proceeds to step 128 and operates to regrow the token from a seed location selected from among the unmarked pixels of the current token, as per the routine of FIG. 4A, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token. Neck testing identifies Type C tokens that cross material boundaries, and regrows the identified tokens to provide single material Type C tokens suitable for use in creating Type B tokens.

FIG. 4D shows Type B tokens generated from the Type C tokens of FIG. 4C, according to a feature of the present invention. The present invention provides a novel exemplary technique using log chromaticity clustering, for constructing Type B tokens for an image file 18. Log chromaticity is a technique for developing an illumination invariant chromaticity space.

A method and system for separating illumination and reflectance using a log chromaticity representation is disclosed in U.S. Pat. No. 7,596,266, which is hereby expressly incorporated by reference. The techniques taught in U.S. Pat. No. 7,596,266 can be used to provide illumination invariant log chromaticity representation values for each color of an image, for example, as represented by Type C tokens. Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

FIG. 5 is a graphic representation of a log color space, bi-illuminant chromaticity plane according to a feature of the invention disclosed in U.S. Pat. No. 7,596,266. The alignment of the chromaticity plane is determined by a vector N, normal to the chromaticity plane, and defined as N=log(Bright$_{vector}$)−log(Dark$_{vector}$)=log(1+1/S$_{vector}$). The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5.

Thus, according to the technique disclosed in U.S. Pat. No. 7,596,266, the RGB values of each pixel in an image file 18 can be mapped by the CPU 12 from the image file value p(n, m, R, G, B) to a log value, then, through a projection to the chromaticity plane, to the corresponding u, v value, as shown in FIG. 5. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to a feature of the present invention, log chromaticity values are calculated for each color depicted in an image file 18 input to the CPU 12 for identification of regions of the uniform reflectance (Type B tokens). For example, each pixel of a Type C token will be of approximately the same color value, for example, in terms of RGB values, as all the other constituent pixels of the same Type C token, within the noise level of the equipment used to record the image. Thus, an average of the color values for the constituent pixels of each particular Type C token can be used to represent the color value for the respective Type C token in the log chromaticity analysis.

FIG. 6 is a flow chart for determining a list of colors depicted in an input image, for example, an image file 18. In step 200, an input image file 18 is input to the CPU 12 for processing. In steps 202 and 204, the CPU 12 determines the colors depicted in the input image file 18. In step 202, the CPU 12 calculates an average color for each Type C token determined by the CPU 12 through execution of the routine of FIG. 4A, as described above, for a list of colors. The CPU 12 can be operated to optionally require a minimum token size, in terms of the number of constituent pixels of the token, or a minimum seed size (the N×N array) used to determine Type C tokens according to the routine of FIG. 4A, for the analysis. The minimum size requirements are implemented to assure that color measurements in the list of colors for the image are an accurate depiction of color in a scene depicted in the input image, and not an artifact of blend pixels.

Blend pixels are pixels between two differently colored regions of an image. If the colors between the two regions are plotted in RGB space, there is a linear transition between the colors, with each blend pixel, moving from one region to the next, being a weighted average of the colors of the two regions. Thus, each blend pixel does not represent a true color of the image. If blend pixels are present, relatively small Type C tokens, consisting of blend pixels, can be identified for areas of an image between two differently colored regions. By requiring a size minimum, the CPU 12 can eliminate tokens consisting of blend pixel from the analysis.

In step 204, the CPU 12 can alternatively collect colors at the pixel level, that is, the RGB values of the pixels of the input image file 18, as shown in FIG. 2. The CPU 12 can be operated to optionally require each pixel of the image file 18 used in the analysis to have a minimum stability or local standard deviation via a filter output, for a more accurate list of colors. For example, second derivative energy can be used to indicate the stability of pixels of an image.

In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. Upon the calculation of the second derivative energy for each of the pixels, the CPU 12 analyzes the energy values of the pixels. There is an inverse relationship between second derivative energy and pixel stability, the higher the energy, the less stable the corresponding pixel.

In step 206, the CPU 12 outputs a list or lists of color (after executing one or both of steps 202 and/or 204). According to a feature of the present invention, all of the further processing can be executed using the list from either step 202 or 204, or vary the list used (one or the other of the lists from steps 202 or 204) at each subsequent step.

FIG. 7 is a flow chart for determining an orientation for a log chromaticity representation, according to a feature of the present invention. For example, the CPU 12 determines an orientation for the normal N, for a log chromaticity plane, as shown in FIG. 5. In step 210, the CPU 12 receives a list of colors for an input file 18, such as a list output in step 206 of the routine of FIG. 6. In step 212, the CPU 12 determines an orientation for a log chromaticity space.

As taught in U.S. Pat. No. 7,596,266, and as noted above, alignment of the chromaticity plane is represented by N, N being a vector normal to the chromaticity representation, for example, the chromaticity plane of FIG. 5. The orientation is estimated by the CPU 12 thorough execution of any one of several techniques. For example, the CPU 12 can determine estimates based upon entropy minimization, manual selection by a user or the use of a characteristic spectral ratio for an image of an input image file 18, as fully disclosed in U.S. Pat. No. 7,596,266.

For a higher dimensional set of colors, for example, an RYGB space (red, yellow, green, blue), the log chromaticity normal, N, defines a sub-space with one less dimension than the input space. Thus, in the four dimensional RYGB space, the normal N defines a three dimensional log chromaticity space. When the four dimensional RYGB values are projected into the three dimensional log chromaticity space, the projected values within the log chromaticity space are unaffected by illumination variation.

In step 214, the CPU 12 outputs an orientation for the normal N. As illustrated in the example of FIG. 5, the normal N defines an orientation for a u, v plane in a three dimensional RGB space.

FIG. 8 is a flow chart for determining log chromaticity coordinates for the colors of an input image, as identified in steps 202 or 204 of the routine of FIG. 6, according to a feature of the present invention. In step 220, a list of colors is input to the CPU 12. The list of colors can comprise either the list generated through execution of step 202 of the routine of FIG. 6, or the list generated through execution of step 204. In step 222, the log chromaticity orientation for the normal, N, determined through execution of the routine of FIG. 7, is also input to the CPU 12.

In step 224, the CPU 12 operates to calculate a log value for each color in the list of colors and plots the log values in a three dimensional log space at respective (log R, log G, log B) coordinates, as illustrated in FIG. 5. Materials A, B and C denote log values for specific colors from the list of colors input to the CPU 12 in step 220. A log chromaticity plane is also calculated by the CPU 12, in the three dimensional log space, with u, v coordinates and an orientation set by N, input to the CPU 12 in step 222. Each u, v coordinate in the log chromaticity plane can also be designated by a corresponding (log R, log G, log B) coordinate in the three dimensional log space.

According to a feature of the present invention, the CPU 12 then projects the log values for the colors A, B and C onto the log chromaticity plane to determine a u, v log chromaticity coordinate for each color. Each u, v log chromaticity coordinate can be expressed by the corresponding (log R, log G, log B) coordinate in the three dimensional log space. The CPU 12 outputs a list of the log chromaticity coordinates in step 226. The list cross-references each color to a u, v log chromaticity coordinate and to the pixels (or a Type C tokens) having the respective color (depending upon the list of colors used in the analysis (either step 202(tokens) or 204 (pixels))).

FIG. 9 is a flow chart for optionally augmenting the log chromaticity coordinates for pixels or Type C tokens with extra dimensions, according to a feature of the present invention. In step 230, the list of log chromaticity coordinates, determined for the colors of the input image through execution of the routine of FIG. 8, is input to the CPU 12. In step 232, the CPU 12 accesses the input image file 18, for use in the augmentation.

In step 234, the CPU 12 optionally operates to augment each log chromaticity coordinate with a tone mapping intensity for each corresponding pixel (or Type C token). The tone mapping intensity is determined using any known tone mapping technique. An augmentation with tone mapping intensity information provides a basis for clustering pixels or tokens that are grouped according to both similar log chromaticity coordinates and similar tone mapping intensities. This improves the accuracy of a clustering step.

In step 236, the CPU 12 optionally operates to augment each log chromaticity coordinate with x, y coordinates for the corresponding pixel (or an average of the x, y coordinates for the constituent pixels of a Type C token) (see FIG. 2 showing a P (1,1) to P (N, M) pixel arrangement). Thus, a clustering step with x, y coordinate information will provide groups in a spatially limited arrangement, when that characteristic is desired.

In each of steps 234 and 236, the augmented information can, in each case, be weighted by a factor $w_1$ and $w_2$, $w_3$ respectively, to specify the relative importance and scale of the different dimensions in the augmented coordinates. The weight factors $w_1$ and $w_2$, $w_3$ are user-specified. Accordingly, the (log R, log G, log B) coordinates for a pixel or Type C token is augmented to (log R, log G, log B, $T*w_1$, $x*w_2$, $y*w_3$) where T, x and y are the tone mapped intensity, the x coordinate and the y coordinate, respectively.

In step 238, the CPU 12 outputs a list of the augmented coordinates. The augmented log chromaticity coordinates provide accurate illumination invariant representations of the pixels, or for a specified regional arrangement of an input image, such as, for example, Type C tokens. According to a feature of the present invention, the illumination invariant characteristic of the log chromaticity coordinates is relied upon as a basis to identify regions of an image of a single material or reflectance, such as, for example, Type B tokens.

FIG. 10 is a flow chart for clustering the log chromaticity coordinates, according to a feature of the present invention. In step 240, the list of augmented log chromaticity coordinates is input the CPU 12. In step 242, the CPU 12 operates to cluster the log chromaticity coordinates. The clustering step can be implemented via, for example, a known k-means clustering. Any known clustering technique can be used to cluster the log chromaticity coordinates to determine groups of similar log chromaticity coordinate values. The CPU 12 correlates each log chromaticity coordinate to the group to which the respective coordinate belongs. The CPU 12 also operates to calculate a center for each group identified in the clustering step. For example, the CPU 12 can determine a center for each group relative to a (log R, log G, log B, log T) space.

In step 244, the CPU 12 outputs a list of the cluster group memberships for the log chromaticity coordinates (cross referenced to either the corresponding pixels or Type C tokens) and/or a list of cluster group centers.

As noted above, in the execution of the clustering method, the CPU 12 can use the list of colors from either the list generated through execution of step 202 of the routine of FIG. 6, or the list generated through execution of step 204. In applying the identified cluster groups to an input image, the CPU 12 can be operated to use the same set of colors as used in the clustering method (one of the list of colors corresponding to step 202 or to the list of colors corresponding to step 204), or apply a different set of colors (the other of the list of colors corresponding to step 202 or the list of colors corresponding to step 204). If a different set of colors is used, the CPU 12 proceeds to execute the routine of FIG. 11.

FIG. 11 is a flow chart for assigning the log chromaticity coordinates to clusters determined through execution of the routine of FIG. 10, when a different list of colors is used after the identification of the cluster groups, according to a feature of the present invention. In step 250, the CPU 12 once again executes the routine of FIG. 8, this time in respect to the new list of colors. For example, if the list of colors generated in step 202 (colors based upon Type C tokens) was used to identify the cluster groups, and the CPU 12 then operates to classify log chromaticity coordinates relative to cluster groups based upon the list of colors generated in step 204 (colors based upon pixels), step 250 of the routine of FIG. 11 is executed to determine the log chromaticity coordinates for the colors of the pixels in the input image file 18.

In step 252, the list of cluster centers is input to the CPU 12. In step 254, the CPU 12 operates to classify each of the log chromaticity coordinates identified in step 250, according to the nearest cluster group center. In step 256, the CPU 12 outputs a list of the cluster group memberships for the log chromaticity coordinates based upon the new list of colors, with a cross reference to either corresponding pixels or Type C tokens, depending upon the list of colors used in step 250 (the list of colors generated in step 202 or the list of colors generated in step 204).

FIG. 12 is a flow chart for detecting regions of uniform reflectance based on the log chromaticity clustering according to a feature of the present invention. In step 260, the input image file 18 is once again provided to the CPU 12. In step 262, one of the pixels or Type C tokens, depending upon the list of colors used in step 250, is input to the CPU 12. In step 264, the cluster membership information, form either steps 244 or 256, is input to the CPU 12.

In step 266, the CPU 12 operates to merge each of the pixels, or specified regions of an input image, such as, for example, Type C tokens, having a same cluster group membership into a single region of the image to represent a region of uniform reflectance (Type B token). The CPU 12 performs such a merge operation for all of the pixels or tokens, as the case may be, for the input image file 18. In step 268, the CPU 12 outputs a list of all regions of uniform reflectance (and also of similar tone mapping intensities and x, y coordinates, if the log chromaticity coordinates were augmented in steps 234 and/or 236). It should be noted that each region of uniform reflectance (Type B token) determined according to the features of the present invention, potentially has significant illumination variation across the region.

U.S. Patent Publication No. US 2010/0142825 teaches a constraint/solver model for segregating illumination and material in an image, including an optimized solution based upon a same material constraint. A same material constraint, as taught in U.S. Patent Publication No. US 2010/0142825, utilizes Type C tokens and Type B tokens, as can be determined according to the teachings of the present invention. The constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Implementation of the constraint/solver model according to the techniques and teachings of U.S. Patent Publication No. US 2010/0142825, utilizing the Type C tokens and Type B tokens obtained via a log chromaticity clustering technique according to the present invention, provides a highly effective and efficient method for generating the intrinsic images corresponding to the original input image (steps 1004 and 1006 of FIG. 3A). The intrinsic images can be used to enhance the accuracy and efficiency of image processing, image analysis and computer vision applications, for example, the detection and removal of specularity from an image, as noted above.

Figure 3B:
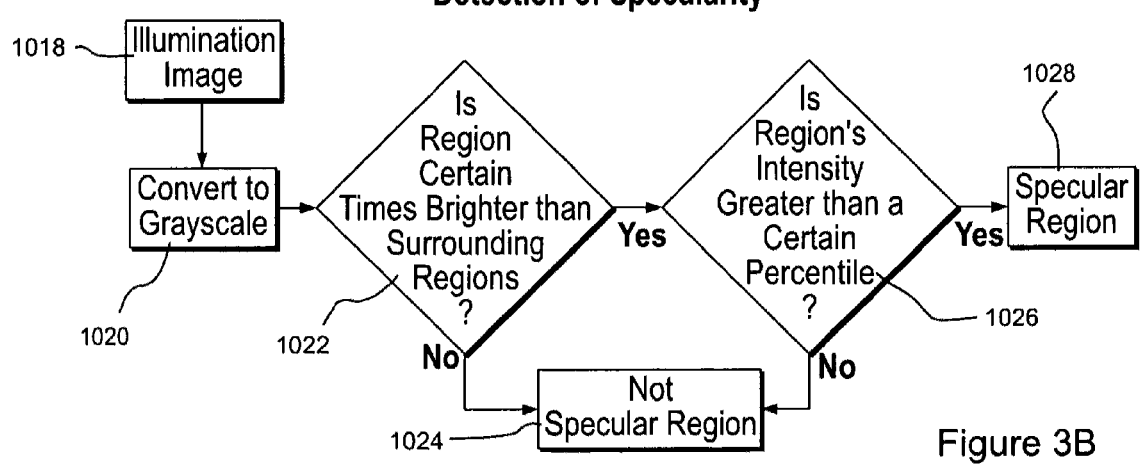
FIG. 3B is a flow chart for a routine to detect specularity for use in the routine of FIG. 3A.

Returning once again to FIG. 3A, in step 1008, the CPU 12 analyzes the illumination image output (step 1004), to detect specularities. As noted above, in the exemplary embodiment of the present invention, advantage is taken of the fact that specularity manifests in the illumination. According to the exemplary embodiment of the present invention, processing relevant to specularity is performed in the illumination image so as to not adversely impact material reflectance aspects of an image when removing specularities, for improved results. FIG. 3B is a flow chart for a routine to detect specularity, for use in an implementation of step 1008 of the exemplary embodiment of the present invention illustrated in the routine of FIG. 3A.

In steps 1018, 1020, (FIG. 3B) the CPU 12 converts the illumination image to grayscale, and then proceeds to analyze regions of the illumination image for attributes that indicate if each respective region is a specular region. The regions can be the Type C tokens identified in connection with the generation of the intrinsic images, as described above. In a decision block 1022, the CPU 12 determines if a region being examined (for example, a specific Type C token) is a certain predetermined times brighter than surrounding regions. The brightness analysis is a threshold measure to eliminate regions that are not bright enough relative to the surrounding area to be specular.

If a region being examined is not the certain times brighter than the surrounding regions, it is listed as "Not Specular Region" (step 1024).

If the region being examined is the certain times brighter, the region is then input to a decision block 1026. In the decision block 1026, the CPU 12 determines if the region being examined is at an intensity that is greater than a certain predetermined percentile.

If the region being examined has an intensity that is not greater than the certain percentile, it is then listed as "Not Specular Region" (step 1024).

If the region being examined is at an intensity that is greater than the certain percentile, it is then listed as a "Specular Region" (step 1028).

In the respective decision blocks (1022, 1026), the "certain times brighter" and "certain percentile" are each set empirically.

In an alternative exemplary embodiment of the present invention, the routine of FIG. 3B is executed in respect to both the material image and the illumination image. In that case, regions of the material image are examined in two steps. In a first step, each region is examined as to color properties such as log chromaticity coordinates. If the color properties of the examined region are not similar to surrounding regions, it is classified as "Not Specular Region." If the color properties are similar to surrounding regions, the region is further examined to determine if the region is brighter than the surrounding the regions. For example, is the region being examined brighter than a certain percentile of material image intensity and a certain time brighter than the surrounding regions. If the region being examined is not brighter than the surrounding regions, it is classified as "Not Specular Region." If it is, the region is classified as "Specular."

It should be noted that the material image is illumination invariant, since all the illumination aspects of the original image are depicted in the illumination image. Thus, any variance in color intensity can be attributed to the presence of a specularity, rather than a shadow. The alternative embodiment for FIG. 3B takes advantage of the fact that specularity can contain both material and illumination properties and that the detection and removal of specularities can be improved by operating on both the intrinsic material and illumination images generated from an original image, for detection of specularity.

After analyzing each region of an input image pursuant to the routine of FIG. 3B, the CPU 12 will have compiled listings of the regions of the image indicating each region as either a specular region or not a specular region. The CPU 12 then proceeds to step 1010 (FIG. 3A) to perform an operation on the regions of the input image listed as specular, to remove the specularity present in the input image. A known technique such as in-painting can be used to fill in the detected region of specularity in, for example, the illumination image, based upon the illumination characteristics of the regions surrounding the listed specular regions.

For detailed information on known in-painting techniques, reference can be made to the following publications:

[1] "Inpainting and the Fundamental Problem of Image Processing" by Shen, SIAM News, Vol. 36, Number 5, June, 2003,

[2] M. Bertalmio, A. L. Bertozzi, G. Sapiro, "Navier-Stokes, Fluid Dynamics, and Image and Video Inpainting", Proceedings of the International Conference on Computer Vision and Pattern Recognition, IEEE, December 2001, Kauai, Hi., volume I, pp. 1-355-1362

[3] M. Bertalmio, G. Sapiro, V. Caselles, and C. Ballester, "Image Inpainting", SIGGRAPH 2000, pages 417-424

[4] Alexandru Telea. An image inpainting technique based on the fast marching method. Journal of Graphics, GPU, and Game Tools, 9(1):23-34, 2004.

According to a further feature of the present invention, other methods can be implemented to remove the specularities from one of the intrinsic images. For example, gradient masking or gradient clamping can be used in place of the in-painting technique.

After removal of the specularity, the CPU 12 proceeds to step 1012. In an exemplary embodiment of the present invention, in step 1012, the CPU 12 optionally performs operations to remove other illumination effects. For example, the illumination image displays potentially undesirable illumination effects such as cast shadows and strong trends that can make one side of an image brighter than the other side, for example, when a face is lit from one side. Such illumination effects can cause faulty operation of a CPU operation, such as execution of a face recognition algorithm.

According to a feature of the present invention, a post processing operation can be performed in step 1012 to factor the illumination image so as to separate the diffuse shading aspects of the illumination image from the cast shadow and strong trend aspects of the illumination image. To that end, the CPU 12 is operated to perform an edge preserving blurring filter operation. For example, a bilateral filter can be applied to the illumination image to naturally preserve the sharp transitions due to cast shadows and strong trends. If the filter is applied several times in succession, for example, three or four times, the slowly-varying curvature will be removed from the illumination image, while the transitions due to cast shadows and strong trends will be retained in the modified illumination image.

In an exemplary embodiment of the present invention, the CPU 12 applies a bilateral filter to a log illumination image, one or more times in succession. The resulting blurred log illumination image, showing only cast shadows and strong trends, is then subtracted from the original log illumination image to provide a log diffuse shading illumination image (output step 1014).

In another exemplary embodiment of the present invention, the step of removing specularity (1010) is performed after performance of the optional step of factoring the illumination (1012), to remove the specularity from the diffuse illumination image.

In step 1016, the reflectance image (from step 1006) is combined with the diffuse illumination image (from step 1014). In the event that only a diffuse-looking result image is needed for further processing (and not the diffuse illumination field separately), such as in a face recognition operation, an edge preserving blurring technique can be applied to the illumination image, as described above, and then the original image is divided by this processed illumination image (or subtracted in log space) to obtain an image that appears like it was taken in diffuse conditions. This is mathematically equivalent to multiplying the diffuse shading by the reflectance image. The result, in any event, at the output step 1016, is a final image that is shadow and specular free, for improved further processing, in such important applications as computer vision applications.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
providing an image file depicting an image, in a computer memory;
processing the image to generate intrinsic images including a material image and an illumination image, the processing of the image being carried out by executing a spatio-spectral operator/constraint/solver model for image segregation such that the material image comprises a representation of material expressed as a separate, multi-band representation for the material, independent of illumination, each band of the multi-band representation for the material corresponding to a segment of the electro-magnetic spectrum, and such that the illumination image comprises a representation of the illumination expressed as a separate, multi-band representation for the illumination, independent of the material, each band multi-band representation for the illumination corresponding to a segment of the electro-magnetic spectrum; and
detecting and removing specularity as a function of the intrinsic images, the detecting specularity including analyzing at least one of the material image and the illumination image.

2. The method of claim 1 wherein the step of removing specularity is executed in respect to the illumination image.

3. The method of claim 2 including the further step of combining the illumination image, after executing the step of detecting and removing specularity in the illumination image, with the material image.

4. The method of claim 2 including the further step of processing the illumination image to generate a diffuse illumination image.

5. The method of claim 4 including the further step of combining the diffuse illumination image with the material image.

6. The method of claim 2 wherein the step of removing specularity in the illumination image is executed by an in-painting technique.

7. The method of claim 1 wherein the step of detecting specularity is executed in respect to the material image and the illumination image, and the step of removing specularity is executed in respect to the illumination image.

8. A computer system which comprises:
a CPU; and
a memory storing an image file containing an image;
the CPU arranged and configured to execute a routine to process the image to generate intrinsic images including a material image and an illumination image, and detect and remove specularity as a function of the intrinsic images, the processing of the image being carried out by executing a spatio-spectral operator/constraint/solver model for image segregation such that the material image comprises a representation of material expressed as a separate, multi-band representation for the material, independent of illumination, each band of the multi-band representation for the material corresponding to a segment of the electro-magnetic spectrum, and such that the illumination image comprises a representation of the illumination expressed as a separate, multi-band representation for the illumination, independent of the material, each band multi-band representation for the illumination corresponding to a segment of the electro-magnetic spectrum, the detecting specularity including analyzing at least one of the material image and the illumination image.

9. The computer system of claim 8 wherein the step of removing specularity as a function of the intrinsic images is executed in respect to the illumination image.

10. The computer system of claim 9 wherein the routine includes the further step of combing combining the illumination image, after executing the step of detecting and removing specularity in the illumination image, with the material image.

11. A computer program product, disposed on a non-transitory computer readable media, the product including computer executable process steps operable to control a computer to: provide an image file depicting an image, in a computer memory, process the image to generate intrinsic images including a material image and an illumination image, and detect and remove specularity as a function of the intrinsic images, the processing of the image being carried out by executing a spatio-spectral operator/constraint/solver model for image segregation such that the material image comprises a representation of material expressed as a separate, multi-band representation for the material, independent of illumination, each band of the multi-band representation for the material corresponding to a segment of the electro-magnetic spectrum, and such that the illumination image comprises a representation of the illumination expressed as a separate, multi-band representation for the illumination, independent of the material, each band multi-band representation for the illumination corresponding to a segment of the electro-magnetic spectrum, the detecting specularity including analyzing at least one of the material image and the illumination image.

12. The computer program product of claim 11 wherein the process step of removing specularity as a function of the intrinsic images is executed in respect to the illumination image.

13. The computer program product of claim 12 including the further process step of combining the illumination image, after executing the step of detecting and removing specularity in the illumination image, with the material image.

14. The computer program product of claim 12 including the further process step of processing the illumination image to generate a diffuse illumination image.

15. The computer program product of claim 14 including the further process step of combining the diffuse illumination image with the material image.

16. The computer program product of claim 12 wherein the process step of removing specularity in the illumination image is executed by an in-painting technique.

17. The computer program product of claim 11 wherein the process step of detecting specularity as a function of the intrinsic images is executed in respect to the material image and the illumination image, and the process step of removing specularity as a function of the intrinsic images is executed in respect to the illumination image.

18. The method as recited in claim 1 wherein the detecting specularity includes determining if a region of the illumination image is a certain predetermined times brighter than surrounding regions of the illumination image and listing the region as not being specular if the region is not the certain predetermined times brighter than the surrounding regions.

19. The method as recited in claim 1 wherein the detecting specularity includes determining if a region of the illumination image is at an intensity that is greater than a certain predetermined percentile and listing the region as not being specular if the region is not greater than the certain predetermined percentile.

20. The method as recited in claim 1 wherein the detecting specularity includes comparing color properties of a region of the material image to color properties of surrounding regions of the material image and listing the region as not being specular if the color properties of the region are not similar to color properties of the surrounding regions.

21. The method as recited in claim 1 wherein the detecting specularity includes determining if a region of the material image is a brighter than surrounding regions of the material image and listing the region as not being specular if the region is not brighter than the surrounding regions.

* * * * *

UNITED STATES PATENT AND TRADEMARK OFFICE
CERTIFICATE OF CORRECTION

| | | |
|---|---|---|
| PATENT NO. | : 8,577,150 B2 | |
| APPLICATION NO. | : 13/065274 | |
| DATED | : November 5, 2013 | |
| INVENTOR(S) | : Garg | |

It is certified that error appears in the above-identified patent and that said Letters Patent is hereby corrected as shown below:

In the Claims

Column 15, lines 45 and 46, Claim 10, delete:

"includes the further step of combing combining the illumination image..."

and insert

--includes the further step of combining the illumination image...--

Signed and Sealed this
Twenty-second Day of April, 2014

Michelle K. Lee
*Deputy Director of the United States Patent and Trademark Office*